US006487541B1

United States Patent
Aggarwal et al.

(10) Patent No.: US 6,487,541 B1
(45) Date of Patent: Nov. 26, 2002

(54) SYSTEM AND METHOD FOR COLLABORATIVE FILTERING WITH APPLICATIONS TO E-COMMERCE

(75) Inventors: Charu Chandra Aggarwal, Ossining, NY (US); Joel Leonard Wolf, Katonah, NY (US); Philip Shi-Lung Yu, Chappaqua, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/236,051

(22) Filed: Jan. 22, 1999

(51) Int. Cl.$^7$ .............................................. G06F 17/60
(52) U.S. Cl. .............................. 705/26; 705/1; 705/14; 705/27
(58) Field of Search .............................. 705/26, 27, 14, 705/1

(56) References Cited

U.S. PATENT DOCUMENTS

| | | | | |
|---|---|---|---|---|
| 4,870,579 A | * | 9/1989 | Hey | ........................... 364/419 |
| 4,996,642 A | | 2/1991 | Hey | |
| 5,704,017 A | * | 12/1997 | Heckerman et al. | ........... 395/61 |
| 6,189,005 B1 | * | 2/2001 | Chakrabarti et al. | ............ 707/6 |
| 2001/0013009 A1 | * | 8/2001 | Greening et al. | .............. 705/10 |
| 2001/0014868 A1 | * | 8/2001 | Herz et al. | ..................... 705/14 |

FOREIGN PATENT DOCUMENTS

| | | | | |
|---|---|---|---|---|
| WO | WO 98/33135 | * | 7/1998 | ........... G06F/17/60 |

OTHER PUBLICATIONS

Ubois, It's a Jungle Out There, Upside v10n3 PP: 106–110 (pp. 1–2 of Abstract), Mar. 1998.*
Brandt, Internet Kamikazee: Yahoo's Tim Koogle, Upside v10nl PP: 100, 102+, Jan. 1998.*
Rapoza, GourpLens Sees The Future, PC Week, v15 n26 P46(1), Jun. 29, 1998.*
Rapoza, Alexa's Theory of Relativity, PC Week, v14 n35 p2(1) Aug. 18, 1997.*
Upendra, Shardanand et al., Social Information Filtering: Algorithms for Automating "Word of Mouth", Proceedings of C '95, Denver, Colorado, pp. 210–217, 1995.*
Kautz et al., The Hidden Web, American Association for Artificial Intelligence, 1997 extracted from web site: http://jamesthornton.com on Apr. 26, 2002.*
Upendra Shardanand et al., "Social Information Filtering: Algorithms for Automating 'Word of Mouth'", Proceedings of CHI '95, Denver, Colorado, pp. 210–217, 1995.

* cited by examiner

*Primary Examiner*—Wynn Coggins
*Assistant Examiner*—Yogesh C. Garg
(74) *Attorney, Agent, or Firm*—F. Chau & Associates, LLP

(57) ABSTRACT

A rating of a plurality of ratings is predicted. The rating is associated with a user of a plurality of users and the rating corresponds to an item of a plurality of items. One of the plurality of ratings, corresponding to at least one of the plurality of items, is provided for each of the plurality of users. A predictability relation between ones of the plurality of users and other ones of the plurality of users is calculated based on ratings provided by users. One of a plurality of nodes is assigned to each of the plurality of users. Ones of the plurality of nodes are connected with other ones of the plurality of nodes by a plurality of edges based on the predictability relation. A graph which includes the plurality of nodes and the plurality of edges is searched for a path from a node assigned to the user of the plurality of users to another node assigned to another user of the plurality of users. The rating of the plurality of ratings associated with the user of a plurality of users is calculated based on the path and the predictability relation. If desired, a predicted rating may be produced for identifying products and customers in an e-commerce applications.

22 Claims, 9 Drawing Sheets

SYSTEM AND METHOD FOR COLLABORATIVE FILTERING WITH APPLICATIONS TO E-COMMERCE

FIELD OF THE INVENTION

The present invention relates generally to making a prediction about a user based on data provided in association with other users. In particular, a rating associated with a user is forecasted based on a predictability graph. Furthermore, the present invention relates to an automated system and method for providing recommendations of items for sale in an e-commerce environment.

BACKGROUND OF THE INVENTION

A computing environment offers an opportunity to collect information relating to the various preferences of users. User preferences may take the form of a rating which is associated with an item. A rating may be a quantitative measure of a users relative like or dislike of an item. For example, a user purchasing compact discs, books, or videos over the Internet may provide an integer, in a given range, indicating his/her satisfaction with a product available for sale.

Rating information provided by a group of users may be useful for recommending items to a user. In other words, the preference of a user may be predicted based on ratings for items provided by a group of users. One user may be found "similar" in his preferences to other users. Users with "similar" ratings may be used to predict each other's preferences. Deducing the preferences of a given user by examining information about the preferences of other "similar" users is often referred to as collaborative filtering. Users collaborate by each rating a subset of a set of items. The collective knowledge attained from the collaborative rating of items may then be used to make recommendations. For example, if, based on the collective knowledge, it is predicted that an item would be highly rated by a user, the item may be recommended to the user.

Collaborative filtering may be used to make recommendations to customers purchasing items for sale on the World Wide Web. Alternatively, collaborative filtering may be used to make marketing recommendation to vendors using the World Wide Web. In general, due to the nature of a distributed computer environment, collaborative filtering may be used to make recommendations and/or customize preferences of users involved in electronic transactions or e-commerce. Suppose, for example, that the amount of time a user spends viewing a Web page is regarded as an implicit rating of the Web page by the user. Users with "similar" viewing habits may be detected. Based on the observed viewing habits of users, recommendations may be calculated which estimate the interest a user may take in a particular Web page. In this way, a Web page estimated to be of interest to a particular user may be recommended to the user. For instance, if a user spends much time browsing Web pages detailing information relating to running, a Web page giving a comparative study of running shoes may be recommended to the user. The Web page giving the comparative study of running shoes may be recommended based on the amount of time other users, viewing running related Web pages, spend viewing the study.

Several collaborative filtering engines are currently available. A discussion of such collaborative filtering engines may be found, for example, in U.S. Pat. No. 4,870,579 and U.S. Pat. No. 4,996,642 both issued to John B. Hey (employed in collaborative filtering technology offered by LikeMinds Inc.), and Upendra Shardanand and Pattie Maes (a founder and former director of Firefly Network, Inc.), "Social Information Filtering: Algorithms for Automating Word of Mouth," Proceedings of CHI '95, Denver, Colo., 1995,pages 210–217.

The technology employed by LikeMinds Inc., as disclosed in U.S. Pat. Nos. 4,870,579 and 4,996,642 involves random sampling of users. A measure of "agreement strength" between a current user and the randomly sampled users is computed. A subset is then chosen of the randomly sampled users. Each member of the subset corresponds to either a relatively high "measurement strength" or a relatively high item coverage. Item predictions are computed based on a "closeness" function of pairs of ratings by member of the subset.

The technology employed by Firefly Network, Inc. involves computing a Pearson r coefficient to measure the "similarity" between two users. Users who are "similar" to a given user are identified. Predictions are made by forming a weighted average of ratings provided by the "similar" group of users. The weighting factor used to form the average of ratings of items is made proportional to the Pearson coefficient.

SUMMARY OF THE INVENTION

A rating of a plurality of ratings is predicted. The rating is associated with a user of a plurality of users and the rating corresponds to an item of a plurality of items. One of the plurality of ratings, corresponding to at least one of the plurality of items, is provided for each of the plurality of users. A predictability relation between ones of the plurality of users and other ones of the plurality of users is calculated based on ratings provided by users. One of a plurality of nodes is assigned to each of the plurality of users. Ones of the plurality of nodes are connected with other ones of the plurality of nodes by a plurality of edges based on the predictability relation. A graph which includes the plurality of nodes and the plurality of edges is searched for a path from a node assigned to the user of the plurality of users to another node assigned to another user of the plurality of users. The rating of the plurality of ratings associated with the user of a plurality of users is calculated based on the path and the predictability relation.

BRIEF DESCRIPTION OF THE DRAWINGS

The invention is best understood from the following detailed description when read in connection with the accompanying drawings. It is emphasized that, according to common practice, the various features of the drawings are not to scale. On the contrary, the dimensions of the various features are arbitrarily expanded or reduced for clarity.

DETAILED DESCRIPTION OF THE INVENTION

Horting and Predictability

Figure 1:
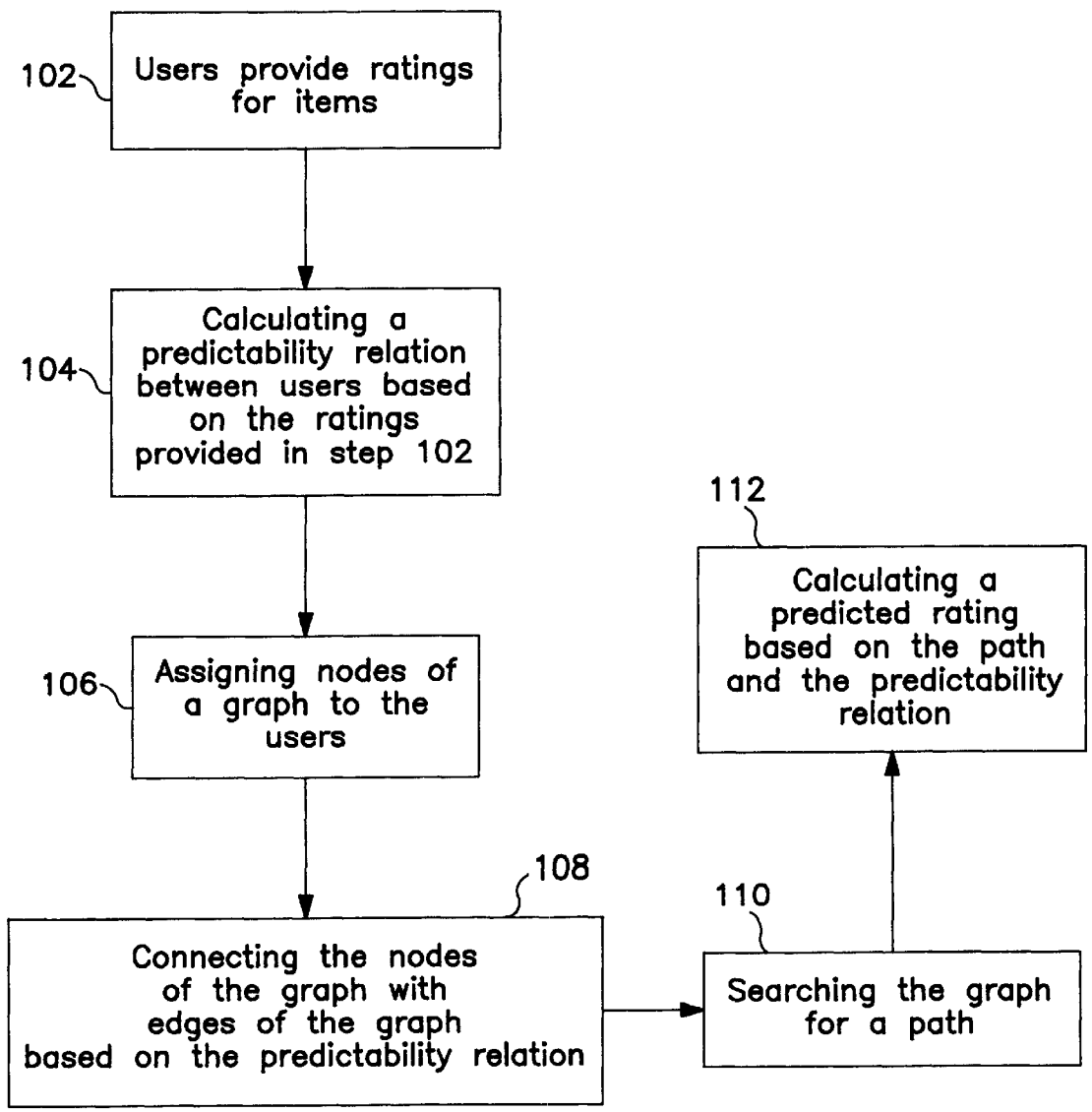
FIG. 1 illustrates steps in a collaborative filtering process in accordance with an exemplary embodiment of the present invention.

Suppose that N users are involved in a collaborative filtering application. Suppose further that there are K items which may be rated. FIG. 1 illustrates steps in a collaborative application in accordance with an exemplary embodiment of the present invention. In step 102 each of the N users may provide ratings for some (but possibly none) of the K items. Define a binary matrix $M \in \{0,1\}^{N \times K}$ by $$M_{i,j} = \begin{cases} 1 & \text{if user } i \text{ rated item } j \\ 0 & \text{otherwise} \end{cases}$$

Define the set $R_i = \{j \in \{1, \ldots, K\} : M_{i,j} = 1\}$.

Thus, the set $R_i$ is a set indicating all items rated by the $i^{th}$ user. Note that the cardinality of the set $R_i$, namely $|R_i| = \Sigma_j M_{i,j}$, is the row sum for the $i^{th}$ row. The number of users who have rated an item j may be expressed by the column sum $\Sigma_i M_{i,j}$.

A user may rate an item by providing a corresponding integer in a given range. If the $i^{th}$ user rated the $j^{th}$ item, i.e. $M_{i,j}=1$, the rating may be denoted by $r_{i,j}=\{1, \ldots, v\}$. For example, a so-called seven point scale, i.e. v=7, is commonly used. A so-called thirteen point scale, i.e. v=13, is also commonly used, though there is evidence to support the notion that ratings $r_{i,j}$ varying between 1 and 7 provide users with a sufficiently discriminating scale (see Shardanand and Maes Supra). Note that odd values of V allow a user to express neutrality, while even values of V may force a user to express a positive or negative opinion.

In the following two relations, horting and predictability, will be defined on a set of users. Let $i_1$ and $i_2$ indicate two users of a set of users.

$i_1$ horts $i_2$ if $|R_{i_1} \cap R_{i_2}|/|R_{i_1}| \geq F$     (1)

where F is a predetermined value in (0,1]. Alternatively, a horting relation may be defined by $i_1$ horts $i_2$ if $|R_{i_1} \cap R_{i_2}|/|R_{i_2}| \geq F$ or $|R_{i_1} \cap R_{i_2}| \geq G$     (2)

where G is a predetermined threshold. Note that horting is reflexive but is neither symmetric nor transitive. Thus, the terminology $i_1$ horts $i_2$ is employed, but not the term cohorts. The terminology $i_1$ horts $i_2$ expresses the notion that sufficiently many jointly rated items exist between user $i_1$ and user $i_2$, from user $i_1$'s perspective, to decide whether user $i_2$ predicts user $i_1$ in some sense. A calculation to decide whether user $i_2$ predicts user $i_1$ will be given below.

For a pair $<s,t> \in \{-1,+1\} \times \{t_{s,0}, \ldots, t_{s,1}\}$ define a transformation on ratings by $T_{s,t}(r) = s*r+t$, where $r \in \{1, \ldots, v\}$. For example, if $t_{-1,0}=2$ and $t_{-1,1}=2v$ are chosen, then $\exists r' \in \{1, \ldots, v\}$ such that $T_{-1,t}(r') \in \{1, \ldots, v\}$. If $t_{1,0}=1-v$ and $t_{1,1}=v-1$ are chosen, then $\exists r'' \in \{1, \ldots, v\}$ such that $T_{1,t}(r'') \in \{1, \ldots, v\}$. A predictability relation may be defined by $i_2$ predicts $i_1$ if
  (i) $i_1$ horts $i_2$;
  (ii) $\exists <s,t> \in \{-1,+1\} \times \{t_{s,0}, \ldots, t_{s,1}\}$ such that $$D_{s,t}(i_1, i_2) = \frac{\left[ \sum_{j \in R_{i_1} \cap R_{i_2}} \|r_{i_1,j} - T_{s,t}(r_{i_2,j})\| \right]}{|R_{i_1} \cap R_{i_2}|} \leq U,$$

where U is a predetermined threshold. $D_{s,t}(i_1, i_2)$ represents a measure of distance between the ratings of user $i_1$ and the ($T_{s,t}$) transformed ratings of user $i_2$, on the set of items rated by both users, normalized by the cardinality of the set of items rated by both users. For example, if $D_{1,0}(i_1, i_2)=0$ then user $i_2$ behaves identically to user $i_1$, and if $D_{1,1}(i_1, i_2)=0$ then user $i_1$ consistently rates items one unit higher than user $i_2$. If $D_{-1,v+1}(i_1, i_2)=0$ then user $i_2$ behaves identically opposite to user $i_1$.

In step 104 a predictability relation between users may be calculated. Note that the predictability relation as defined above is reflexive, but is neither symmetric nor transitive. Let $H_{i_1}$ denote the set of users who are horted by user $i_1$. Let $P_{i_1}$ denote the set of user who predict user $i_1$. Therefore, by definition, $P_{i_1} \subseteq H_{i_1}$. In other words, in order to calculate predictability (according to the above definition) horting may be calculated first.

Figure 2:
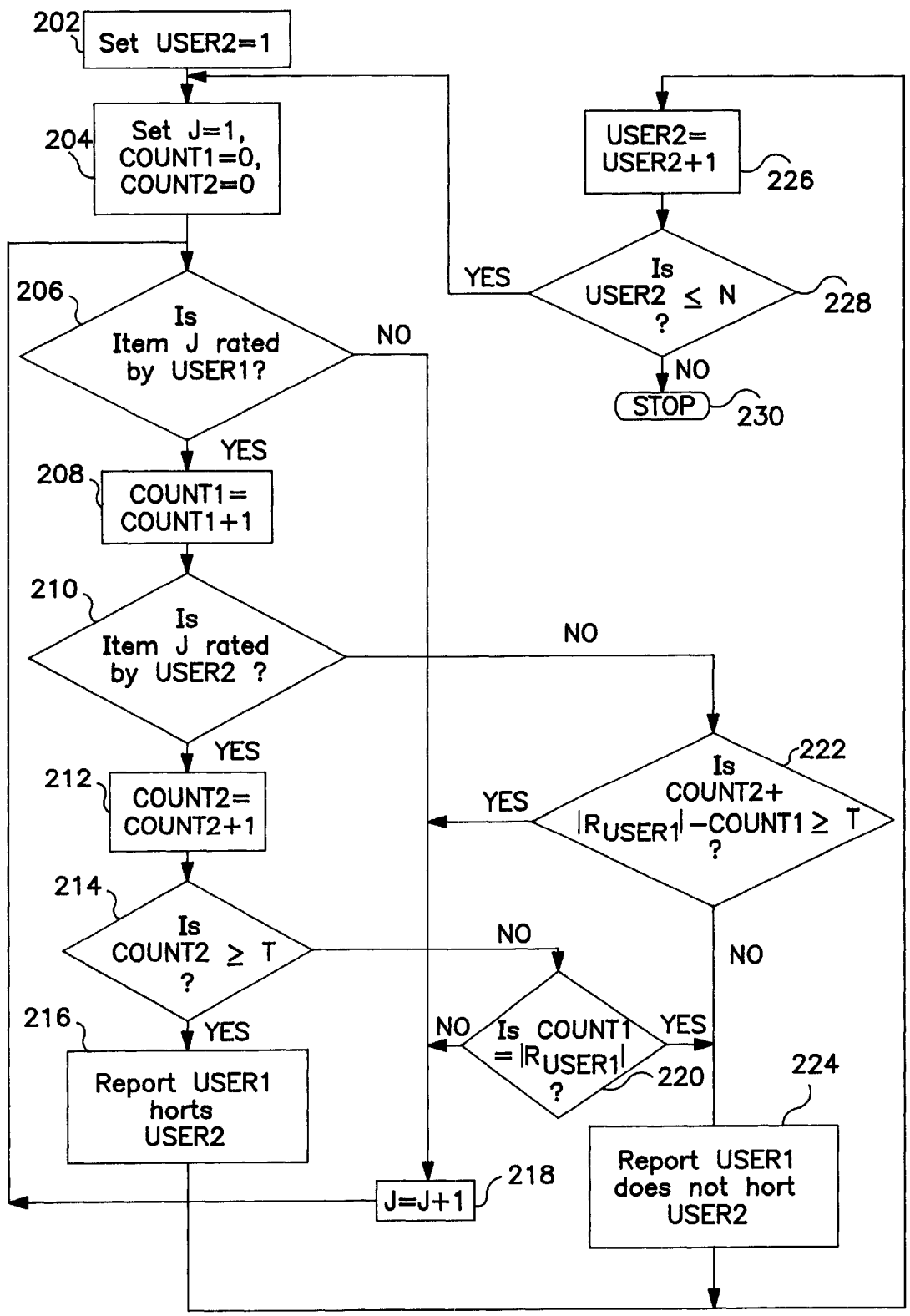
FIG. 2 illustrates a process for calculating the set of users horted by a given user in accordance with an exemplary embodiment of the present invention.

Assume the variable USER1 is set to a given user. FIG. 2 illustrates a recipe for calculating $H_{USER1}$. In step 202 the variable USER2 may be set to the first user of N users. In step 204 an item index J may be set to 1, and two counters COUNT1 and COUNT2 may be set to 0. COUNT1 counts the number of items found that have been rated by USER1, While COUNT2 counts the number of items found that have been rated by both USER1 and USER2.

Let $ITEM_1$ denote the set of users who rated the $1^{th}$ item. Suppose that the sets $ITEM_1$, $1 \leq 1 \leq K$, are sorted such that $|ITEM_1| \leq \ldots \leq |ITEM_K|$. The sets $ITEM_1$ may be accessed using inverted indexes. For a discussion of inverted indexes see, for example, C. Faloutsos, 'Access Methods for Text,' ACM *Computing Surveys*, Vol. 17, No. 1, pp. 50–74, 1985, incorporated by reference herein in its entirety. In step 206 a search, such as, for example, a binary (logarithmic) search may be made to determine if $USER1 \in ITEM_J$, i.e. a determination is made whether USER1 rated item J. As the sets $ITEM_1$, $1 \leq 1 \leq K$, are sorted the sets with lowest cardinality may be searched first to determine if $USER1 \in ITEM_J$. If the question of whether $USER2 \in H_{USER1}$, i.e. whether USER1 horts USER2, may be determined "early" in the process, i.e. for low values of J. the ("later") largest sets ITEM1 may not be searched. Thus, it may be advantageous to sort the set $ITEM_1$, $1 \leq 1 \leq K$ in order of increasing cardinality. It may also be advantageous to sort each set $ITEM_1$ (the set of users who rated the $1^{th}$ item) in order of increasing users, i.e. $ITEM_1$ may be stored as an ordered set $\{1_1, \ldots, 1_m\}$, where $1_1 \leq 1_2 \leq \ldots \leq 1_m$. Sorting each set $ITEM_1$ in order of increasing users may increase the efficiency of a search, as it makes a binary search, for example, possible.

If $USER1 \in ITEM_J$ then in step 208 the variable COUNT1 may be incremented, i.e. COUNT1 may be reset to COUNT1+1. If USER1∉ITEM$_J$ then in step 218 the variable J may be incremented and a search for the next user may be reinitiated in step 206. In step 210 a search, such as, for example, a binary (logarithmic) search may be made to determine if USER2∈ITEM$_J$, i.e. a determination is made whether USER2 rated item J. If USER2 ∈ITEM$_J$ then the variable COUNT2 may be incremented in step 212. In step 214 it is determined whether COUNT2≧T, where T=min (F·|R$_{USER1}$|, G)

If it is determined in step 214 that COUNT2≧T, then in step 216 it may be reported that USER1 horts USER2, i.e. USER2∈R$_{USER1}$. Once a determination is made that USER2∈R$_{USER1}$, the process of FIG. 2 may be reset for the next user. Thus, in step 226 USER2 may be incremented, and provided that a determination is made in step 228 that not all users have yet been searched (i.e. USER2≦N) then the process may be reset to step 204. Once all users have been searched the process may terminate in step 230.

If it is determined in step 210 that USER2∈ITEM$_J$, then in step 222 a determination is made whether there may be a need to continue searching, i.e. whether given that USER2∉ITEM$_J$ it may still be possible that USER1 horts USER2. In other words, if it is determined in step 222 that COUNT2+|R$_{USER1}$|−COUNT1<T then in step 224 it may be reported that USER1 does not hort USER2, i.e. USER2∉R$_{USER1}$. Once a determination is made that USER2∉R$_{USER1}$, the process may be reset for the next user. Thus, in step 226 USER2 may be incremented, and provided that a determination is made in step 228 that not all users have yet been searched (i.e. USER2≦N) then the process may be reset to step 204. Once all users have been searched the process may terminate in step 230.

If it is determined in step 222 that COUNT2+|R$_{USER1}$|−COUNT1≧T, then in step 218 the variable J may be incremented, and the process may be resumed for the next item in step 206.

If it is determined in step 214 that COUNT2<T, then in step 220 a determination is made whether COUNT1=|R$_{USER1}$|. If it is determined in step 220 that COUNT1=|R$_{USER1}$| then it may be reported in step 224 that USER1 does not hort USER2, i.e. USER2∉R$_{USER1}$. If, on the other hand, it is determined in step 220 that COUNT1≠|R$_{USER1}$|, then in step 218 the variable J may be incremented.

Although not explicitly shown in FIG. 2 it will be understood by one of ordinary skill in the art that as the relation of horting is reflexive, the process may be skipped for the case of USER2=USER1.

Figure 3:
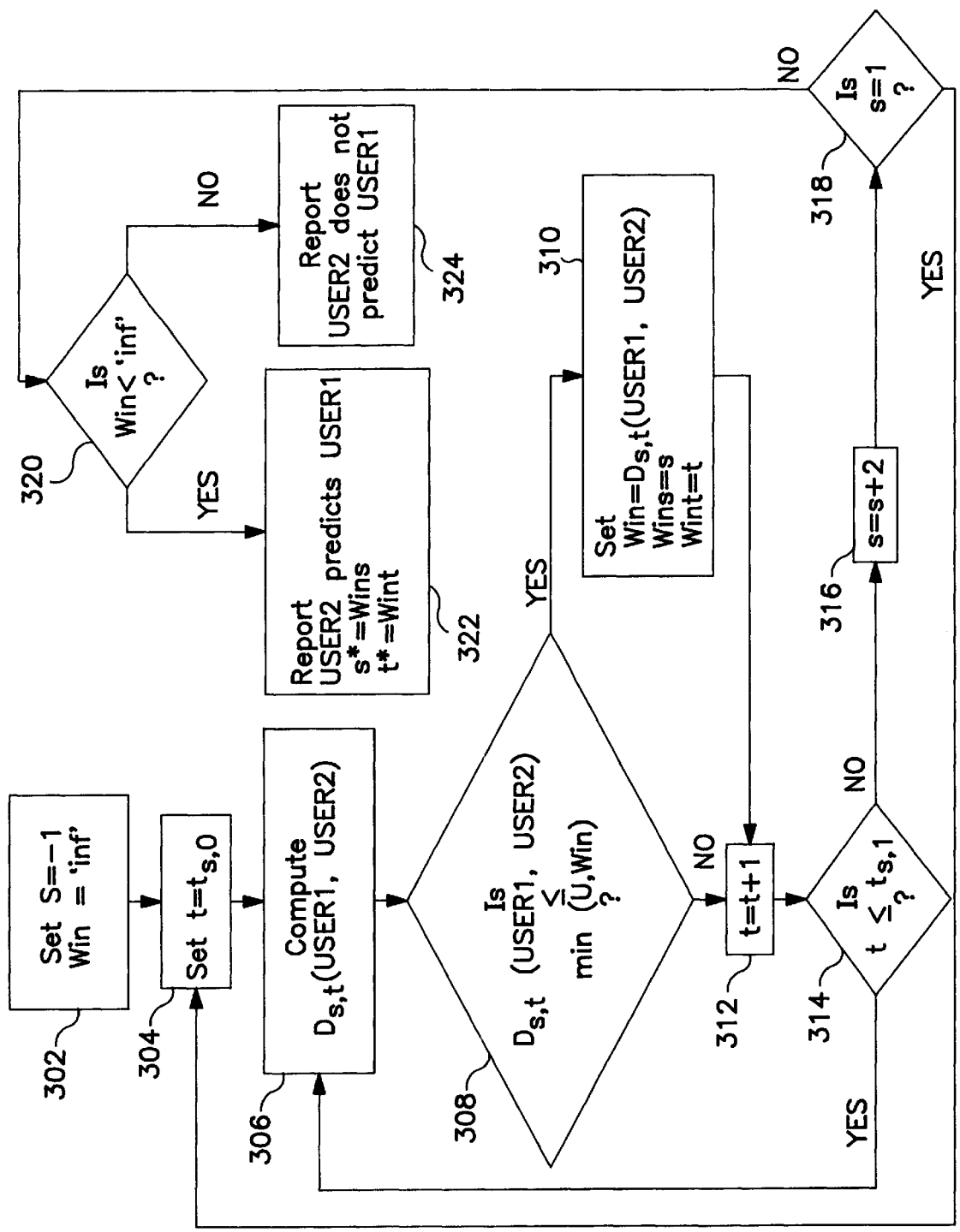
FIG. 3 illustrates a process for calculating the set of users who predict a given user, and the associated predictor values in accordance with an exemplary embodiment of the present invention.

FIG. 3 illustrates a recipe for calculating P$_{USER1}$ after having calculated H$_{USER1}$. Further, if USER2 predicts USER1 then the process illustrated in FIG. 3 provides s* and t* such that $$D_{s^*,t^*}(USER1,USER2)=\min_{s,t}D_{s,t}(USER1,USER2).$$

The pair (s*,t*) is referred to herein as the predictor values. In step 302 the variable s may be set to −1, and the variable Win may be set to 'inf'. Herein, the value 'inf' indicates a value which is larger than any other given value. In step 304 the variable t may be set to T$_{s,0}$. In step 306 D$_{s,t}$(USER1, USER2) may be computed, where it may be assumed that USER2∈H$_{USER1}$. In step 308 a determination may be made whether D$_{s,t}$(USER1,USER2)≦min(U,Win). In other words, in step 308 a test may be performed to determine whether D$_{s,t}$(USER1,USER2) is the lowest value computed thus far by the process, and whether D$_{s,t}$(USER1,USER2) is also below the predetermined threshold U.

If it is determined in step 308 that D$_{s,t}$(USER1,USER2) ≦min(U,Win) then in step 310 the variable Win may be set to D$_{s,t}$(USER1,USER2), Wins may be set to s, and Wint may be set to t. In step 312 variable t may be incremented. In step 314 a determination may be made whether t≦t$_{s,1}$. If it is determined in step 314 that t≦t$_{s,1}$, then the sub-process of steps 306, 308, 310, 312, and 314 may be repeated. If it is determined in step 314 that the value of t exceeds t$_{s,1}$, then in step 316 the variable s is reset to s+2. In step 318 a determination may be made whether s=1. If it is determined in step 318 that s=1, then the sub-process of steps 304, 306, 308, 310, 312, 314, 316, and 318 may be repeated. Otherwise, if it is determined in step 318 that s≠1, then in step 320 a determination may be made whether the variable Win has taken on any value other than the maximal value 'inf' (i.e. if Win<'inf').

If in step 320 it is determined that Win≦'inf', then in step 322 it may be reported that USER2 predicts USER1 (i.e. USER2∈P$_{USER1}$), and further that <s*,t*>=<Wins,Wint> are the corresponding predictor values. Hence, by applying the process illustrated in FIG. 3 to each elements USER2∈H$_{USER1}$ the predictability relation P$_{USER1}$ may be computed.

Once a predictability relation P$_{USER1}$ has been calculated, the relation may be represented by a directed graph. A graph includes both a set of nodes and a set of directed edges. In step 106 of FIG. 1 each of the N users may be assigned a node of a set of N nodes. In step 108 the set of N nodes may be connected by directed edges of the directed graph based on the predictability relation. For example, if a first node is assigned to USER1 and a second node is assigned to USER2, and if USER2 predicts USER1, then a directed edge may connect the first node to the second node. Note that the relation of horting may also be represented by a directed graph.

Figure 4:
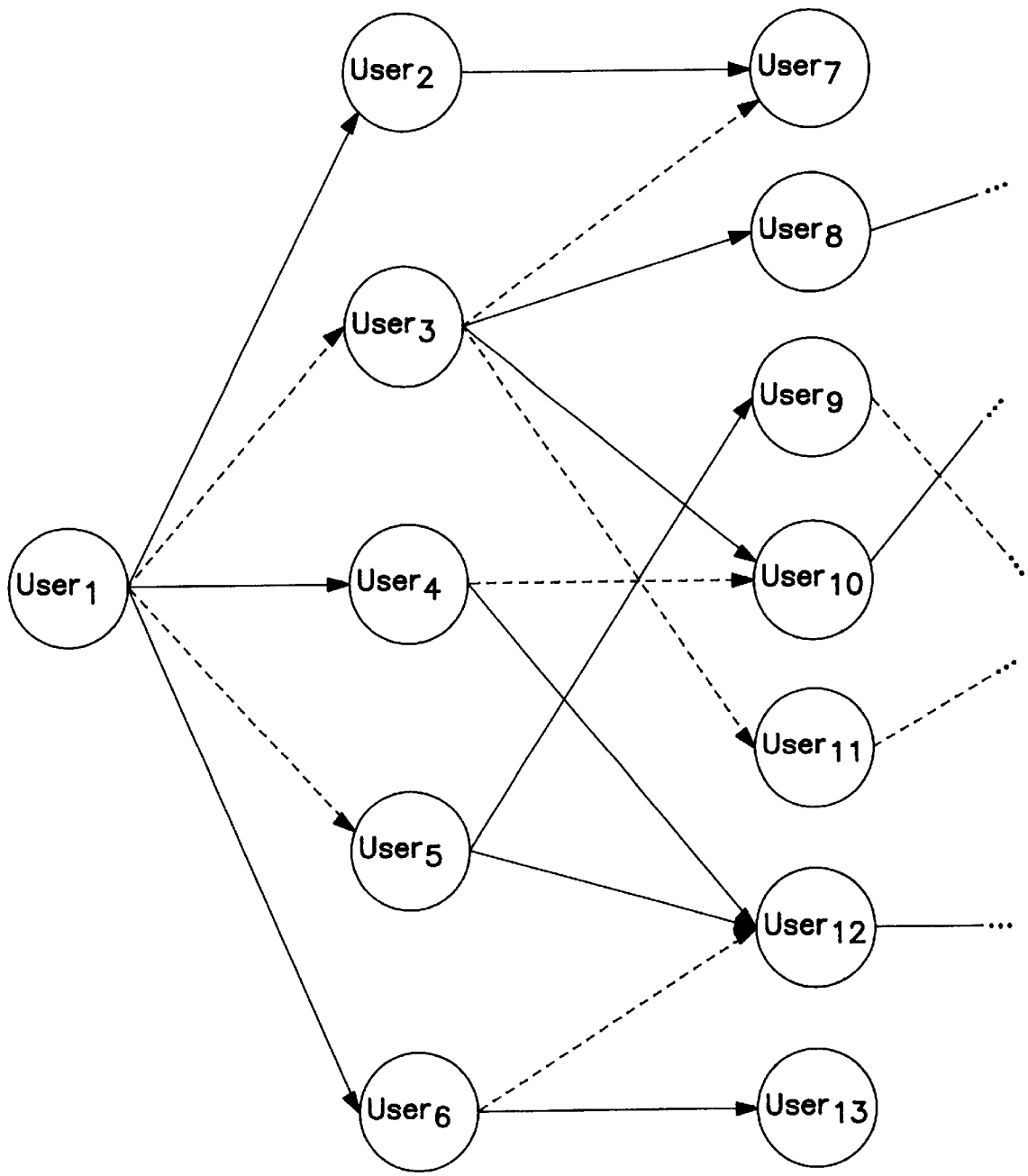
FIG. 4 is a graph of an exemplary predictability and horting relation in accordance with an embodiment of the present invention.

An exemplary graph, representing both a predictability and a horting relation is shown in FIG. 4. In FIG. 4 a solid directed edge between two nodes represents the relation: a user assigned to the destination node predicts a user assigned to the origin node. Further a dashed directed edge in FIG. 4 represents the relation: a user assigned to the origin node horts a user assigned to the destination node. For example, as shown in FIG. 4, user$_1$ horts user$_3$ and user$_5$, but user$_3$ and user$_5$ do not predict user1. Further, user$_2$, user$_4$, and user$_6$, each predict user$_1$. Note that although, trivially, each user both horts and predicts himself/herself, these edges are not considered in this graph.

Suppose that a given user, say user$_i$, has not rated a given item, say item j. Suppose further that a predicted rating of the given item by the given user is sought. In step 110 a predictability graph may be searched for the 'shortest' path (i.e. the least number of edges) connecting between the given user and other users which rated the given item. In other words, a predictability graph may be searched for the 'shortest' path connecting user$_i$ with another user in P$_{user_i}$ who has rated item j. The graph may be searched using any of a variety of graph searching algorithms, such as, for example, a breadth first search. Details on shortest-path graph search algorithms may be found, for example, in T. Cormen, C. Leiserson, and R. Rivest, *Introduction to Algorithms*, MIT Press, Cambridge Mass., 1992. For example, in the graph shown in FIG. 4, let the given user be user$_1$, and assume that both user$_7$ and user$_{12}$ rated item j. Both user$_7$ and user$_{12}$ are a distance of 2 edges from user$_1$ in the graph of P$_{user_1}$. These two equi-length paths are the path from user$_1$ to user$_2$ to user$_7$, and the path from user$_1$ to user$_4$ to user$_{12}$.

In step 112 a predicted rating of item j by user$_i$ may be calculated based on the 'shortest' path(s) found by searching the graph in step 110. The predicted rating of item j may be calculated by composing transformations on rating associated with users which are assigned to nodes along the 'shortest' path(s) in the graph. For example, suppose a directed 'shortest' path may be represented by $$user_i \xrightarrow{(s_1^*,t_1^*)} user_{i_1} \xrightarrow{(s_2^*,t_2^*)} \ldots \xrightarrow{(s_q^*,t_q^*)} user_{i_q},$$

where a prediction is sought for a rating of item j by given user $user_i$, $user_{i_q}$ rates item j, and $<s^*_1,t^*_1>, \ldots, <s^*_q,t^*_q>$ are predictor values corresponding to the path. A prediction associated with such a directed path may be calculated by $$T_{s^*_1,t^*_1} \circ T_{s^*_2,t^*_2} \circ \ldots \circ T_{s^*_q,t^*_q}(r_{user_{i_q}j}) \quad (3)$$

The prediction sought may be given as a weighted average of the value of the function given by (3) computed for each 'shortest' path.

Alternatively, the value of function (3) may be computed for each path in the graph, from a given user to any other user (who rated a given item), having less than a predetermined number of edges. A weighted average of the value(s) of function (3) associated with each of these paths may serve as the predicted rating of the given item by the given user.

Updating a Predictability Relation

A data structure may be maintained in order to store a graph of a predictability relation. The data structure of the predictability graph may store the nodes associated with users, as well as the edges connecting between nodes based on the predictability relation. Additional information may be stored in the data structure. For example, as each node is associated with a user, ratings provided by a user, and predicted ratings previously computed for a user may also be stored with the node associated with the user. In addition, predictor values associated with an edge in the graph may be stored with the edge. Optionally, a data structure may be maintained for a horting relation. If a data structure is maintained for a horting relation, it may be useful to store the values $D_{s,t}(i_1, i_2)$, for each pair $<s,t>$, in addition to an edge connecting user $i_1$ with user $i_2$. In this case predictability may be calculated "on-the-fly".

Updating a data structure for a predictability graph may be necessary when a new user is added, or when an existing user modifies (adds or changes) his/her current ratings for an item or item(s). Hence, when performing the steps of the method illustrated, for example, in FIG. 1, some computations may be performed "on-the-fly". If a given user is new or if the given user modified his/her ratings, the edges originating from the node assigned to the given user in the graph, and related information (e.g. predictor values), may be recomputed. If new users have not been added and existing user have not modified their ratings then a predicted value may be calculated by performing steps 110 and 112 of the method illustrated in FIG. 1.

Queries

Using a method in accordance with an embodiment of the present invention, a predicted rating, of a given item for a given user based on the ratings of other users, may be calculated. The predicted rating calculated may be viewed as a response to a query, submitted to a computer system, for an estimate of the given user's rating of the given item. Various other queries may also be answered by using the calculation of a predicted rating as a building block.

Figure 5:
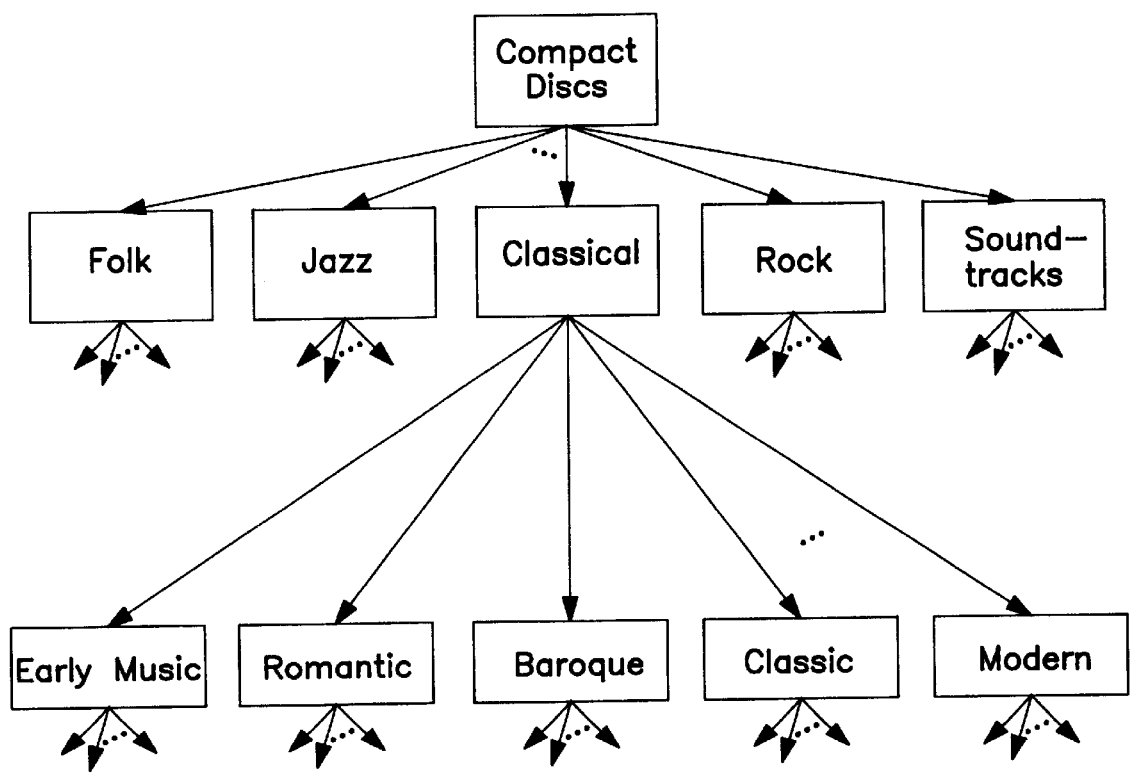
FIG. 5 shows an exemplary tree structure for classifying Compact Discs (CDs) into categories.

Suppose that items rated by users are classified in a category hierarchy or tree. In other words, the set of items rated may be partitioned into categories arranged in a hierarchical or tree structure. The set of items associated with a parent node of the tree structure is the union of the sets of items associated with child nodes of the parent node. The root node, therefore, may be associated with the entire set of items rated. FIG. 5 shows an exemplary tree structure of a hierarchical partition of categories for classifying Compact Discs (CDs). In FIG. 5 the root node is associated with a set of compact discs (CDs). The child nodes of the root nodes may be associated with a set of folk CDs, a set of jazz CDs, a set of classical music CDs, a set of rock CDs, and a set of soundtrack CDs. Each of these categories may in turn be subdivided into more child categories. For example, the node associated with the set of classical CDs may have child nodes associated with a set of early music CDs, a set of romantic music CDs, a set of baroque music CDs, a set of classics CDs, and a set of modern classical music CDs. Each of these sub-categories of classical music may again be subdivided further.

Once a category of items is identified, a computer system may be queried to provide a user with recommendations for items which a given user has not rated, and which the given user is predicted to like the most (provide a relatively high rating for) or the least (provide a relatively low rating for). An "extreme" query may be characterized as a query for items which a given user is predicted to rate high(low) compared with prediction for ratings by the given user of other items.

Figure 6A:
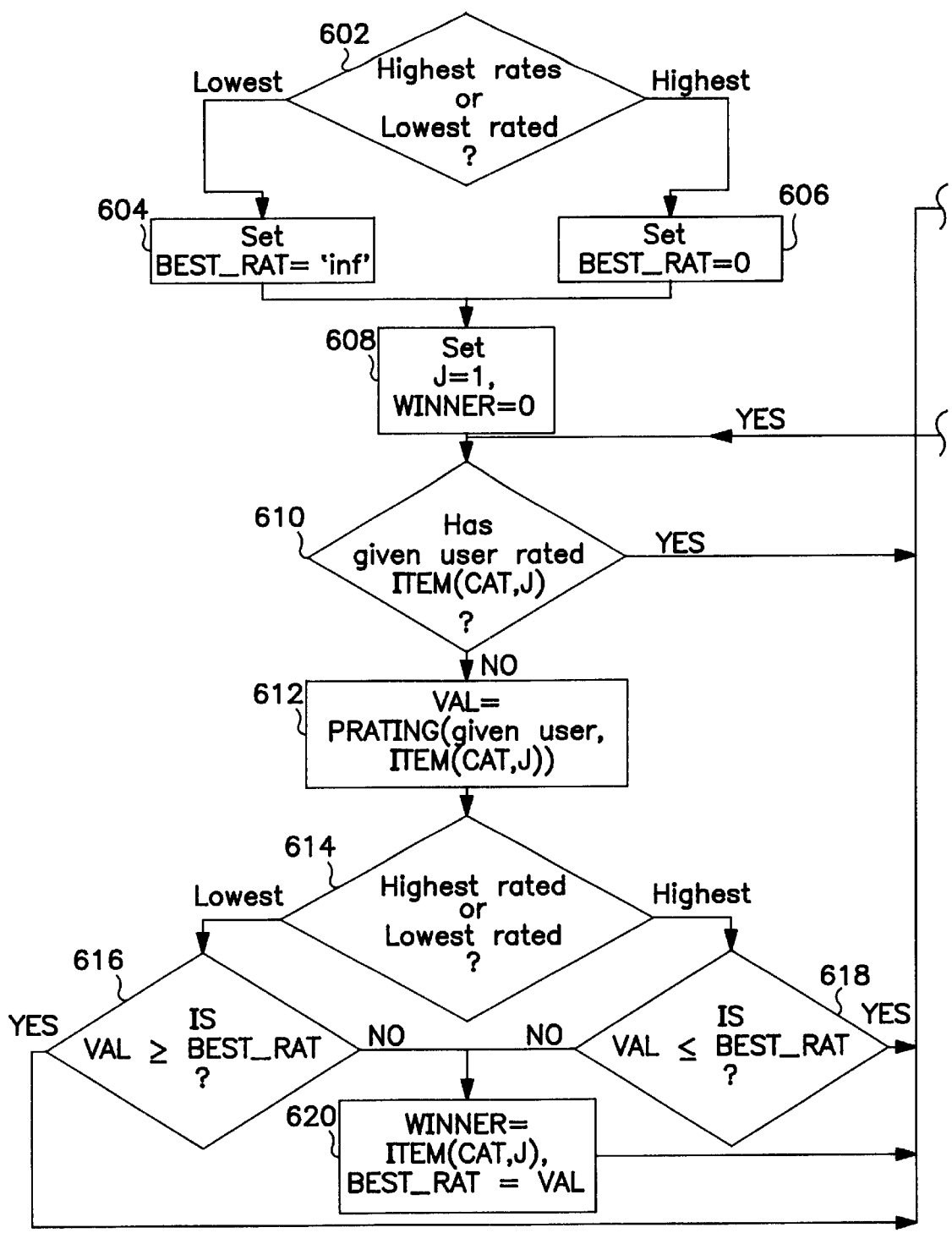
FIGS. 6A and 6B illustrate a method for responding to an "extreme" query for items in a particular category which a given user is predicted to like in accordance with an exemplary embodiment of the present invention.
Figure 6B:
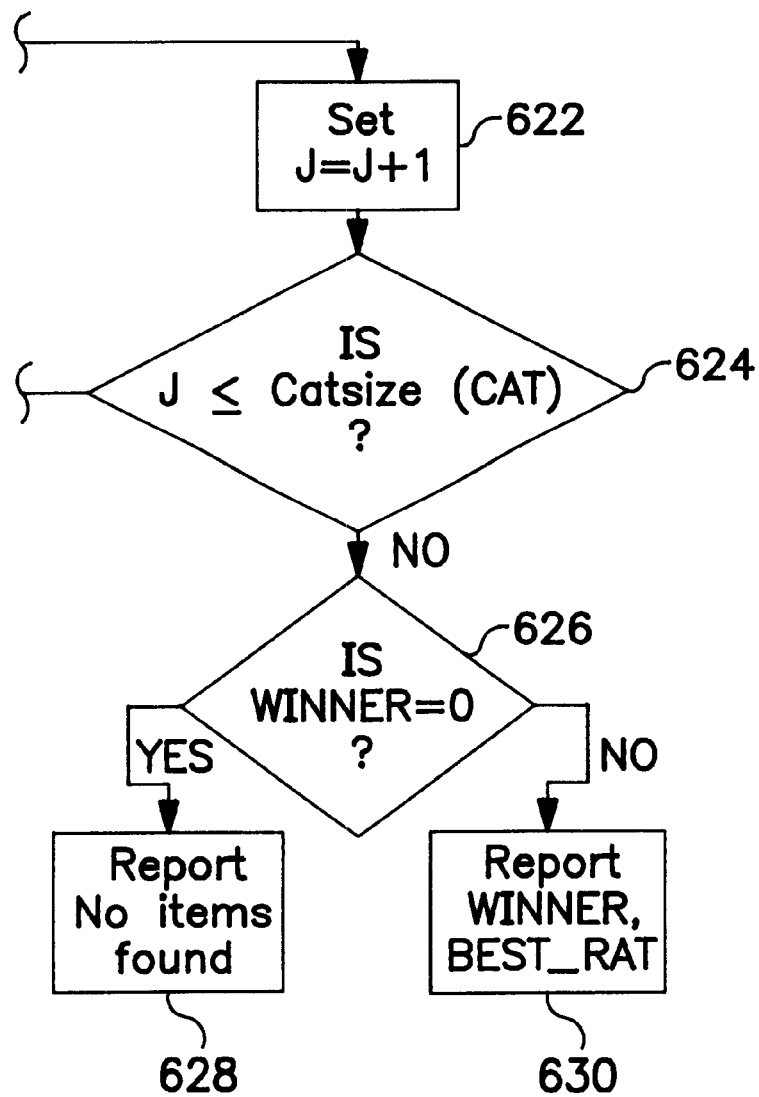

FIGS. 6A and 6B illustrate a method for responding to an "extreme" query for items in a particular category. Suppose a given user is provided along with a given set of items in a category, denoted CAT. In step 602 a choice may be made whether to seek a highest rating prediction or a lowest rating prediction for the given user. If a highest rating prediction is sought in step 602, then in step 604 the variable BEST_RAT may be set to 'inf'. If a lowest rating prediction is sought in step 602, then in step 606 the variable BEST_RAT may be set to 0. In step 608 the variable J indexing a plurality of items may be set to 1. In addition, in step 608 the variable WINNER may be set to 0. The variable WINNER indicates which item (if any) corresponds to either the highest or lowest rating prediction for a given user. In step 610 a determination may be made whether the given user has rated the $J^{th}$ item in the category CAT. If the user has already rated the $J^{th}$ item, then in step 622 the variable J is incremented. If in step 610 it is determined that the given user has not rated the $J^{th}$ item, then in step 612 the variable VAL may be assigned the value of the predicted rating for the $j^{th}$ item in the category CAT for the given user. Such a predicted rating may be obtained, for example, by the method illustrated in FIG. 1.

Note that as the predictability relation may not necessarily be updated, it may not be necessary to repeat steps 102, 104, 106, and 108 of FIG. 1 for every computation of a predicted rating. A predicted rating may be computed by performing steps 110 and 112 of FIG. 1.

In step 614 a determination may be made, consistent with the determination made in step 602, whether the highest or lowest rating prediction is sought for the given user. If a lowest rating prediction is sought in steps 602 and 614, then a determination may be made in step 616 whether the variable VAL is bigger than or equal to the variable BEST_RAT. If a highest rating prediction is sought in steps 602 and 614, then a determination may be made in step 618 whether the variable VAL is less than or equal to the variable BEST_RAT. If in step 616, it is determined that VAL is strictly less than BEST_RAT, then in step 620 the variable WINNER may be set to the j$^{th}$ item in the category CAT, and the variable BEST_RAT reset to VAL. If in step 616, it is determined that VAL is strictly greater than BEST_RAT, then in step 620 the variable WINNER may be set to the J$^{th}$ item in the category CAT, and the variable BEST_RAT reset to VAL. Thus, if in step 616 (step 618) the predicted rating VAL, calculated in step 612, is found less than(greater than) the current best rating BEST_RAT, then the value of BEST_RAT may be reset to VAL before incrementing the variable J in step 622. In this manner it may be possible to keep track of the item corresponding to the highest or lowest predicted rating.

If either in step 616 VAL is determined to be greater than or equal to BEST_RAT or in step 618 VAL is determined to be less than or equal to BEST_RAT, then in step 622 the variable J may be incremented. In step 624 a determination may be made whether all items in the category CAT have been considered. In other words, is the item index J less than or equal to the cardinality of the set of items comprising the category CAT (catsize(CAT)). If all the items in the category CAT have been considered, i.e. if J>catsize(CAT), then in step 626 a determination may be made whether the variable Winner has the value 0. In other words, were any items found, corresponding to highest or lowest ratings, in category CAT.

Note that ratings vary between 1 and v. Hence, if the Winner=0, then in step 628 it is reported that no items were found. On the other hand, if Winner≠0, then in step 626 the item (Winner), having the highest or lowest rating, is reported as well as the corresponding predicted rating (BEST_RAT). For example, if all the items in the category CAT have been rated by the given user, then Winner may retain the value 0 throughout the process illustrated in FIG. 6, and no items corresponding to (highest or lowest) predicted ratings may be found.

If in step 624 the index J is less than catsize(CAT) (the number of item in the category CAT) then the sub-process comprising the steps 610, 612, 614, 616, 618, 620, 622, 624 may be repeated. In other words, assuming the given user has not rated the (J+1)$^{th}$ item, the predicted rating associated with the (J+1)$^{th}$ item in the category CAT may be compared with the current predicted rating BEST_RAT.

Optionally, BEST_RAT may be set to an upper threshold instead of being set to 'inf' in step 604. Setting BEST_RAT to an upper threshold in step 604 causes any items corresponding to predicted ratings with value less than the upper threshold to be considered as a candidate for lowest predicted rating. Further, BEST_RAT may be set to a lower threshold instead of being set to 0 in step 606. Setting BEST_RAT to a lower threshold in step 606 causes any items corresponding to predicted ratings with value greater than the lower threshold to be considered as a candidate for highest predicted rating.

Figure 6:
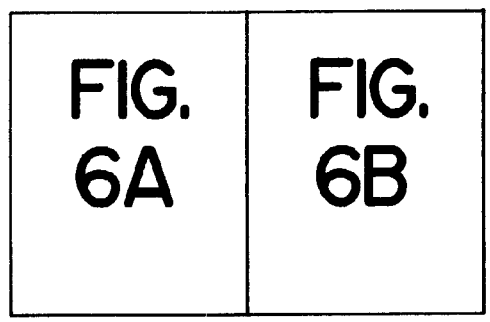

A method for responding to an "extreme" query, such as, for example, the process illustrated in FIG. 6 may have applications in electronic commerce or e-commerce. e-commerce refers to the process of trading goods and commodities by electronic means, for example, purchases made over the Internet. The increasing popularity of the Internet has made e-commerce applications of commercial importance. In particular, a method such as, for example, the process illustrated in FIG. 6 for responding to an "extreme" query, may be used to make recommendations to users in e-commerce applications. It may be desirable, for example for marketing purposes, to predict the types of products which may be (most or least) preferred by a customer. The predicted (preferred) items may be provided to a target customer.

For example, consider a customer interested in purchasing classical music CDs. Suppose that the CDs have been categorized as illustrated in FIG. 5. If the customer is, for example, browsing Web pages concerning early music, then a method for responding to an "extreme" query, may be used to automatically predict which CD in the early music category the customer may rate highest. The CD predicted to be rated highest by the customer may be recommended to the customer by, for example, embedding a banner advertisement in the Web pages viewed by the customer. Further, if the customer had already rated all available early music CDs, or if no ratings may be found, the process for responding to an "extreme" query may be automatically repeated for the parent category of classical CDs. Any of the classical CDs predicted to be rated highest by the customer may then be recommended to the customer.

Responses to other queries may also be deduced by building upon a method for predicting ratings, such as, for example, the method illustrated in FIG. 1. For example, a "target" query may be characterized as a query for a list of users who are predicted to like (rate highly) a given item. Further, a list of users predicted to like a given item may be provided in sorted order of ratings. That is, customers corresponding to higher ratings of the given item may appear at the top of the list.

Figure 7:
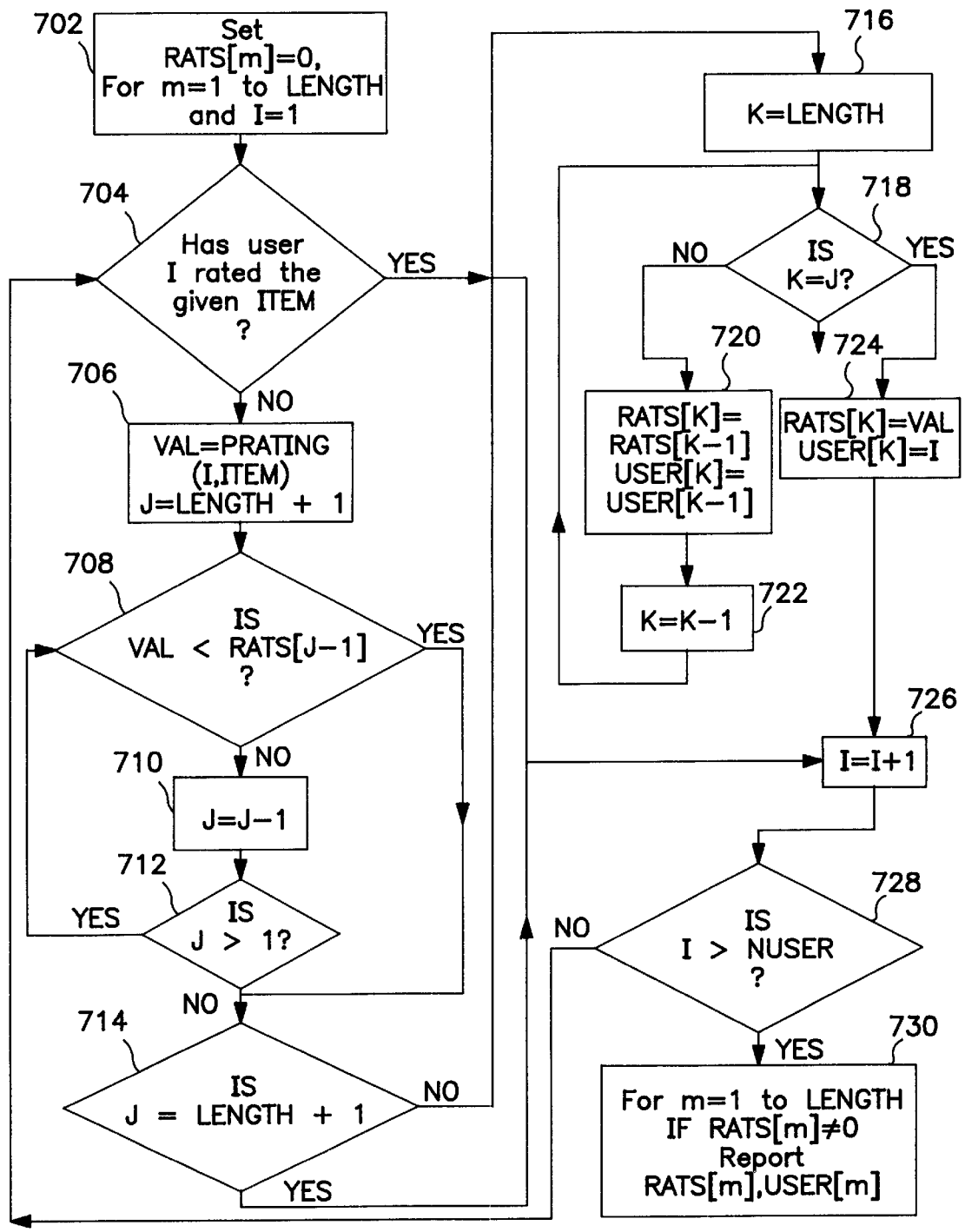
FIG. 7 illustrates a method for responding to a "target" query for a list of users who are predicted to like a given item in accordance with an exemplary embodiment of the present invention.

FIG. 7 illustrates a method for responding to a "target" query for a list of users who are predicted to rate a given item higher than other users. Suppose that a total of Nuser users are involved in a collaborative filtering application. Let LENGTH be the length of the list of users sought. In the exemplary process illustrated in FIG. 7 two lists may be maintained: RATS[·], a list of predicted ratings; and USER [·] a list of corresponding users. In step 702 the (LENGTH) entries of a list RATS[·] may be initialized to 0, and the variable I, indexing users, may be set to 1. In step 704 a determination may be made whether the I$^{th}$ user has rated the given item (ITEM). If the I$^{th}$ user rated the given item, then in step 726 I is incremented. If the I$^{th}$ user has not rated the given item, then in step 706 a predicated rating (VAL= PRATING(I,ITEM)) of the given item by the I$^{th}$ user may be calculated. Such a predicted rating may be obtained, for example, by the method illustrated in FIG. 1. In addition, in step 706 a variable J may be set to LENGTH+1.

Note that as the predictability relation may not necessarily be updated, it may not be necessary to repeat steps 102, 104, 106, and 108 of FIG. 1 for every computation of a predicted rating. A predicted rating may be computed by performing steps 110 and 112 of FIG. 1.

In step 708 a determination may be made whether the predicted rating VAL calculated in step 706 is less than the (J-1)$^{th}$ entry in the list RATS[·], namely RATS[J-1]. If in step 708 it is determined that VAL<RATS[J-1], then the process of FIG. 7 may proceed to step 714. If in step 708 it is determined that VAL is greater or equal to RATS[J-1], then in step 710 J may be decremented. In step 712 a determination may be made whether J>1. If J is determined to be greater than 1, then the process may proceed to step 708. If J is determined to be less than or equal to 1, then in step 714 a determination is made whether J=LENGTH+1. If J is determined in step 714 to be LENGTH+1, the I may be incremented in step 726. Note that steps 708, 710, 712, and 714, utilize the variable J (a list positioning index) to indicate the magnitude of the predicted rating VAL as compared with the ratings stored in the list RATS[·].

If it is determined in step 714 that J≠LENGTH+1, then in step 716 the variable k may be set to LENGTH. Note that if at step 714 it is determined that J≠LENGTH+1, then the value VAL and user I may be inserted into the lists RATS[·] and USER[·],respectively, at the position indicated by J. Thus, in step 718 the values of k and J are compared. If it is determined in step 718 that k=J, then in step 724 RATS[k] may be set to VAL, and USER[k] may be set to I. If in step 718 it is determined that k≠J, then in step 720 RATS[k] may be set to RATS[k−1], and USER[k] may be set to USER[k−1]. In step 722 k may be decremented, i.e. k is reset to k−1. From step 722 the process may proceed to step 718.

From step 724 the process of FIG. 7 may proceed to step 726 in which I may be incremented. In step 728 a determination may be made whether all users involved were considered, i.e. a determination is made whether I>Nuser. If I is greater than Nuser, then all user have been considered. If I is greater than Nuser, then in step 730 all nonzero entries RATS[m] and USER[m], m=1, . . . , LENGTH, may be reported. The nonzero entries in the list RATS[·] are predicted ratings (in non-increasing order) of the given item for the corresponding users in the list USER[·]. If I is less than or equal to Nuser, then from step 728 the process may proceed to step 704, i.e. the $(I+1)^{th}$ user may be considered. Therefore, when the process illustrated in FIG. 7 terminates the list RATS[·] may include (in decreasing order) predicted ratings of the given item for the corresponding users in USER[·]. Further, the list of users produced by the process illustrated in FIG. 7 may be a list of users who are predicted to like the given item more than the other users.

As in the case of an "extreme" query a "target" query may have e-commerce applications. For example, consider the case in which for marketing purposes a company may wish to develop a list of customers or potential customers who are predicted to like a given product. A music CD distributor may, for instance, wish to obtain a list of customers which are predicted to like a given recording. A "target" query may help to provide a list of customers who are predicted to appreciate the given recording.

Responses to other queries may also be deduced by building upon a method for predicting ratings, such as, for example, the method illustrated in FIG. 1. As noted above with respect to an "extreme" and a "target" query other queries may also have e-commerce applications. Some exemplary queries are given in the following:

1. What is the predicted rating of a given item for a given user ?
2. Produce a list of users who have rated the most items in common with a given user (these items may be restricted to a given category).
3. Produce a list of users with whom the ratings of a given user are most similar (this comparison may be made by restricting ratings to items in a given category).
4. Produce a list of users with whom the ratings of a given user are least similar (this comparison may be made by restricting ratings to items in a given category).

In addition similar techniques to those employed for producing responses to queries may be applied in order to provide users with personalized recommendations. For example, upon entering a computer system a user may be presented with a promotional list of items based on predicted ratings. Further, real-time recommendations of items may be made to a user based on items the user just purchased or inquired about. Real-time advertisements may selected and shown to a user viewing a Web page. For example, if a user searches the Internet for information regarding a jazz music CD, then advertisements for other music CDs that the user is predicted to like may be displayed to the user.

Implicit and Explicit Ratings

Ratings may be collected directly from users, for example, by means of a questionnaire (online or offline). Ratings may, however, optionally be collected implicitly, for example, by tracking a user's actions in a computer system. Implicit ratings may be collected, for instance, by using a weighted keyword frequency distribution analysis of browsed Web pages and/or of selections made within Web pages.

Exemplary Computer Apparatus

Figure 8:
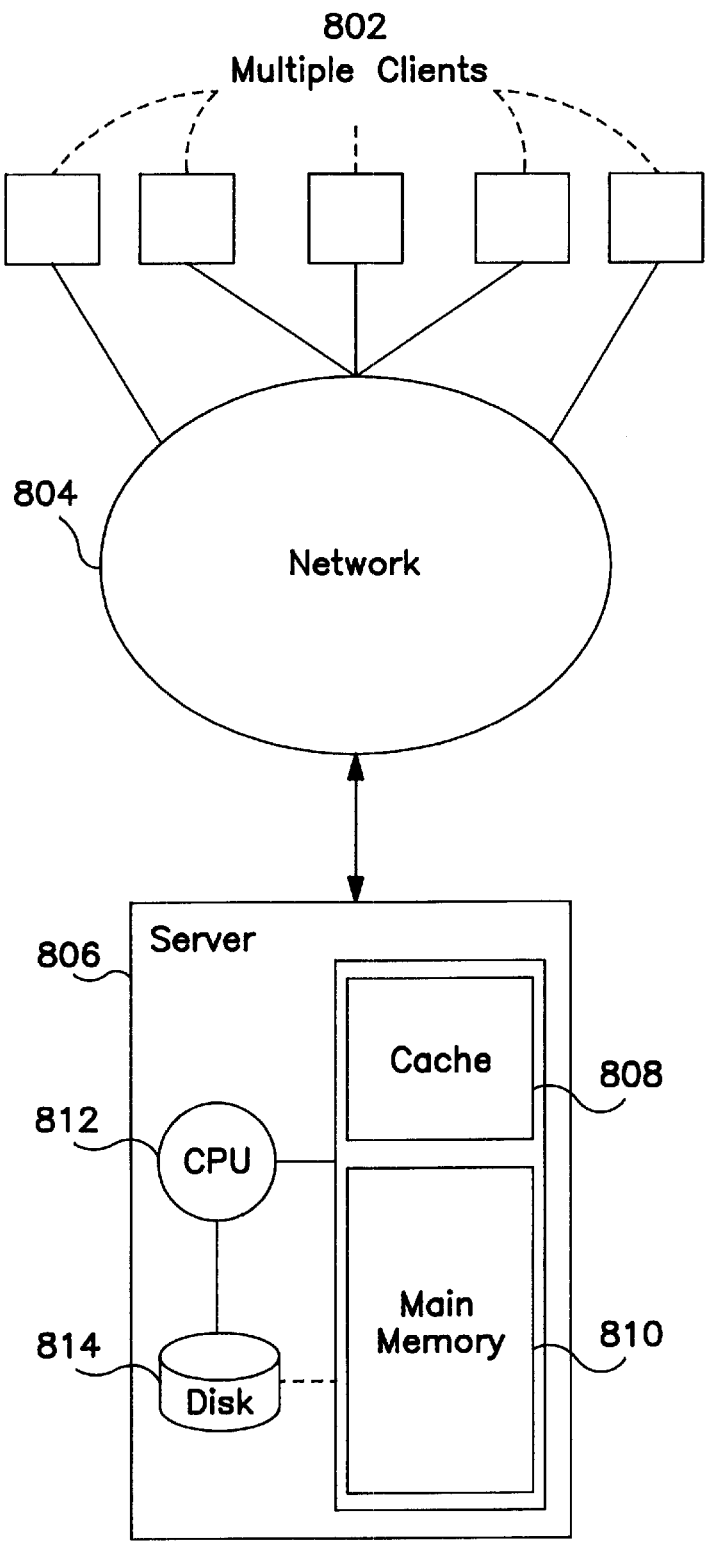
FIG. 8 is a block diagram of an exemplary apparatus for predicting a rating, which corresponds to an item and which is associated with a user, over a computer network in accordance with an embodiment of the present invention.

FIG. 8 is a block diagram of an apparatus for predicting a rating, which corresponds to an item and which is associated with a user, over a computer network. In the embodiment depicted in FIG. 8, multiple client computers 802 may access a server 806, for example a Web server, over a network 804. Server 806 may have a memory 810 as well as a cache 808. The server may further include a Central Processing Unit (CPU) 812 for processing information, and a disk 814 for storing data. Ratings may be collected (implicitly or explicitly) from client computers 802 by server 806 over network 804. Clients 802 may also query server 806 regarding the information stored in data memory 810 and disk 814. In particular, a client computer may supply server 806 with a given user and a given item. Server 806 may compute a projected rating of the given item for the given user based on the information stored in a database on disk 814 and in memory 810. Server 806 may report the predicted rating to a client computer.

Although illustrated and described herein with reference to certain exemplary embodiments, the present invention is nevertheless not intended to be limited to the details shown. Rather, various modifications may be made in the details within the scope and range of equivalents of the claims and without departing from the spirit of the invention.

What is claimed:

1. A method for predicting a rating of a plurality of ratings associated with a user of a plurality of users, the rating corresponding to an item of a plurality of items, said method comprising the steps of:

(a) providing, for each of the plurality of users, one of the plurality of ratings corresponding to at least one of the plurality of items;

(b) calculating a predictability relation between ones of the plurality of users and other ones of the plurality of users based on the result of step (a);

(c) assigning one of a plurality of nodes to each of the plurality of users;

(d) connecting ones of the plurality of nodes with other ones of the plurality of nodes by a plurality of edges based on the predictability relation;

(e) searching a graph which includes the plurality of nodes and the plurality of edges for a path from a node assigned to the user of the plurality of users to an other node assigned to an other user of the plurality of users; and (f) calculating the rating of the plurality of ratings associated with the user of the plurality of users based on the path and the predictability relation.

2. The method of claim 1, wherein the plurality of users are a plurality of customers, the plurality of items represent a plurality of products for sale, and the plurality of ratings are an indication of satisfaction of a customer of the plurality of customers with a product of sale of the plurality of products for sale.

3. The method of claim 1, wherein step (e) includes searching the graph for a shortest path from the node to the other node, the other user having provided any of the plurality of ratings corresponding to the item.

4. The method of claim 1, wherein the path from the node to the other node searched for in step (e) includes less than a predetermined number of edges.

5. The method of claim 1, wherein step (b) includes determining a plurality of transformations of ratings corresponding to the predictability relation based on the result of step (a).

6. The method of claim 5, wherein step (b) further includes determining a plurality of prediction values, each of the plurality of prediction values associated with one of the plurality of transformations of ratings.

7. The method of claim 6, wherein step (f) includes the steps of:
composing ones of the plurality of transformations of ratings based on the path, and
calculating the rating based on the composition of the ones of the plurality of transformations and ones of the plurality of prediction values associated with the ones of the plurality of transformations.

8. The method of claim 1, further comprising the steps of:
partitioning the plurality of items into a plurality of categories;
selecting a category of the plurality of categories;
repeating steps (e) and (f) to calculate a respective rating corresponding to each respective item of the category, the respective rating associated with the user; and
sorting the respective items of the category according to the corresponding respective ratings.

9. The method of claim 1, further comprising the steps of:
partitioning the plurality of items into a plurality of categories;
selecting a category of the plurality of categories;
repeating steps (e) and (f) to calculate a respective rating corresponding to each respective item of the category, the respective rating associated with the user; and
reporting a preferred item of the plurality of items corresponding to a highest rating of the respective ratings of each respective item of the category.

10. The method of claim 1, further comprising the steps of:
partitioning the plurality of items into a plurality of categories;
selecting a category of the plurality of categories;
repeating steps (e) and (f) to calculate a respective rating corresponding to each respective item of the category, the respective rating associated with the user; and
reporting a rejected item of the plurality of items corresponding to a lowest rating of the respective ratings of each respective item of the category.

11. The method of claim 1, further comprising the steps of:
repeating steps (e) and (f) to calculate a respective rating associated with each respective user of the plurality of users, the respective rating corresponding to the item; and
sorting the respective users according to the respective ratings associated with each respective user.

12. An e-commerce method for producing a predicted rating of a plurality of ratings indicating a level of satisfaction of a given customer of a plurality of customers, the predicted rating corresponding to a product of a plurality of products for sale, said method comprising the steps of:
(a) providing, for each of the plurality of customers, one of the plurality of ratings corresponding to at least one of the plurality of products for sale;
(b) calculating a predictability relation between ones of the plurality of customers and other ones of the plurality of customers based on the result of step (a);
(c) assigning one of a plurality of nodes to each of the plurality of customers;
(e) connecting ones of the plurality of nodes with other ones of the plurality of nodes by a plurality of edges based on the predictability relation;
(f) searching a graph which includes the plurality of nodes and the plurality of edges for a path from a node assigned to the given customer of the plurality of customers to an other node assigned to an other customer of the plurality of customers which provided a rating of the plurality of ratings corresponding to the product; and
(g) calculating the predicted rating associated with the customer based on the path and the rating provided by the other customer.

13. The e-commerce method of claim 12, further comprising the steps of:
partitioning the plurality of products for sale into a plurality of categories;
selecting a category of the plurality of categories;
repeating steps (f) and (g) to calculate a respective predicted rating corresponding to each respective product for sale of the category, the respective predicted rating associated with the given customer; and
sorting the products for sale of the category according to the corresponding respective predicted ratings.

14. The e-commerce method of claim 12, further comprising the steps of:
repeating steps (f) and (g) to calculate a respective predicted rating associated with each respective given customer of the plurality of customers, the respective predicted rating corresponding to the product for sale; and
sorting the respective given customers according to the respective predicted ratings associated with each respective given customer.

15. An article of manufacture comprising a computer usable medium having computer readable program code means embodied therein for predicting a rating of a plurality of ratings associated with a user of a plurality of users, the rating corresponding to an item of a plurality of items, the computer readable program code means in said article of manufacture comprising computer readable program code means for causing a computer to effect:
(a) providing, for each of the plurality of users, one of the plurality of ratings corresponding to at least one of the plurality of items;
(b) calculating a predictability relation between ones of the plurality of users and other ones of the plurality of users based on the result of step (a);
(c) assigning one of a plurality of nodes to each of the plurality of users;
(d) connecting ones of the plurality of nodes with other ones of the plurality of nodes by a plurality of edges based on the predictability relation;
(e) searching a graph which includes the plurality of nodes and the plurality of edges for a path from a node assigned to the user of the plurality of users to an other node assigned to an other user of the plurality of users; and (f) calculating the rating of the plurality of ratings associated with the user of the plurality of users based on the path and the predictability relation.

16. An article of manufacture comprising a computer usable medium having computer readable program code means embodied therein for producing a predicted rating of a plurality of ratings indicating a level of satisfaction of a given customer of a plurality of customers, the predicted rating corresponding to a product of a plurality of products for sale, the computer readable program code means in said article of manufacture comprising computer readable program code means for causing a computer to effect:

(a) providing, for each of the plurality of customers, one of the plurality of ratings corresponding to at least one of the plurality of products for sale;

(b) calculating a predictability relation between ones of the plurality of customers and other ones of the plurality of customers based on the result of step (a);

(c) assigning one of a plurality of nodes to each of the plurality of customers;

(e) connecting ones of the plurality of nodes with other ones of the plurality of nodes by a plurality of edges based on the predictability relation;

(f) searching a graph which includes the plurality of nodes and the plurality of edges for a path from a node assigned to the given customer of the plurality of customers to an other node assigned to an other customer of the plurality of customers which provided a rating of the plurality of ratings corresponding to the product; and (g) calculating the predicted rating associated with the customer based on the path and the rating provided by the other customer.

17. An article of manufacture as recited in claim 16, the computer readable program code means in said article of manufacture further comprising computer readable program code means for causing a computer to effect:

partitioning the plurality of products for sale into a plurality of categories;

selecting a category of the plurality of categories;

repeating steps (f) and (g) to calculate a respective predicted rating corresponding to each respective product for sale of the category, the respective predicted rating associated with the given customer; and sorting the products for sale of the category according to the corresponding respective predicted ratings.

18. An article of manufacture as recited in claim 16, the computer readable program code means in said article of manufacture further comprising computer readable program code means for causing a computer to effect:

repeating steps (f) and (g) to calculate a respective predicted rating associated with each respective given customer of the plurality of customers, the respective predicted rating corresponding to the product for sale; and sorting the respective given customers according to the respective predicted ratings associated with each respective given customer.

19. A storage device readable by machine, tangibly embodying a program of instructions executable by the machine to perform method steps for predicting a rating of a plurality of ratings associated with a user of a plurality of users, the rating corresponding to an item of a plurality of items, said method comprising the steps of:

(a) providing, for each of the plurality of users, one of the plurality of ratings corresponding to at least one of the plurality of items;

(b) calculating a predictability relation between ones of the plurality of users and other ones of the plurality of users based on the result of step (a);

(c) assigning one of a plurality of nodes to each of the plurality of users;

(d) connecting ones of the plurality of nodes with other ones of the plurality of nodes by a plurality of edges based on the predictability relation;

(e) searching a graph which includes the plurality of nodes and the plurality of edges for a path from a node assigned to the user of the plurality of users to an other node assigned to an other user of the plurality of users; and (f) calculating the rating of the plurality of ratings associated with the user of the plurality of users based on the path and the predictability relation.

20. A storage device readable by machine, tangibly embodying a program of instructions executable by the machine to perform method steps for producing a predicted rating of a plurality of ratings indicating a level of satisfaction of a given customer of a plurality of customers, the predicted rating corresponding to a product of a plurality of products for sale, said method comprising the steps of:

(a) providing, for each of the plurality of customers, one of the plurality of ratings corresponding to at least one of the plurality of products for sale;

(b) calculating a predictability relation between ones of the plurality of customers and other ones of the plurality of customers based on the result of step (a);

(c) assigning one of a plurality of nodes to each of the plurality of customers;

(e) connecting ones of the plurality of nodes with other ones of the plurality of nodes by a plurality of edges based on the predictability relation;

(f) searching a graph which includes the plurality of nodes and the plurality of edges for a path from a node assigned to the given customer of the plurality of customers to an other node assigned to an other customer of the plurality of customers which provided a rating of the plurality of ratings corresponding to the product; and (g) calculating the predicted rating associated with the customer based on the path and the rating provided by the other customer.

21. The storage device as recited in claim 20, the program of instructions tangibly embodied in said storage device further comprising instructions to perform method steps executable by the machine of:

partitioning the plurality of products for sale into a plurality of categories;

selecting a category of the plurality of categories;

repeating steps (f) and (g) to calculate a respective predicted rating corresponding to each respective product for sale of the category, the respective predicted rating associated with the given customer; and sorting the products for sale of the category according to the corresponding respective predicted ratings.

22. The storage device as recited in claim 20, the program of instructions tangibly embodied in said storage device further comprising instructions to perform method steps executable by the machine of:

repeating steps (f) and (g) to calculate a respective predicted rating associated with each respective given customer of the plurality of customers, the respective predicted rating corresponding to the product for sale; and sorting the respective given customers according to the respective predicted ratings associated with each respective given customer.

* * * * *